US00H002203H

(19) United States
(12) Statutory Invention Registration
Borchardt et al.

(10) Reg. No.: US H2203 H
(43) Published: Oct. 2, 2007

(54) CONTAINER CLIP

(75) Inventors: Ronald E. Borchardt, Newburgh, IN (US); Jeffrey C. Minnette, Evansville, IN (US); Clayton L. Robinson, Elberfeld, IN (US); Randall K. Julian, Spurgeon, IN (US)

(73) Assignee: Bristol-Myers Squibb Company, Princeton, NJ (US)

(21) Appl. No.: 29/252,923

(22) Filed: Jan. 30, 2006

(51) LOC (8) Cl. ..... 08-08

(52) U.S. Cl. ..... D8/396

(58) Field of Classification Search ..... D8/356, D8/371, 394–396; 248/74.2, 215, 227.1, 248/49, 300, 301, 316.7, 51, 489; 24/22, 24/67 R, 20 S, 115 R, 546, 563, 910, 343, 24/67.9; D19/65

See application file for complete search history.

(56) References Cited

U.S. PATENT DOCUMENTS

| | | | | | |
|---|---|---|---|---|---|
| 316,062 | A | | 4/1885 | Riessner | |
| 521,773 | A | | 6/1894 | Decker | |
| 593,312 | A | | 11/1897 | Schandein et al. | |
| 658,042 | A | | 9/1900 | Mendel | |
| 701,070 | A | | 5/1902 | Minwegen | |
| 822,984 | A | | 6/1906 | Richter | |
| 954,564 | A | | 4/1910 | Dunfee | |
| 956,741 | A | | 5/1910 | Smith | |
| D53,853 | S | | 9/1919 | Kimmel | |
| 1,389,984 | A | | 9/1921 | Reed | |
| 1,863,283 | A | | 6/1932 | Rogers | |
| 1,980,930 | A | | 11/1934 | Reyniers | 211/74 |
| 2,432,496 | A | | 12/1947 | Beason | 215/11 |
| D156,729 | S | | 1/1950 | Hampe et al. | D44/29 |
| 2,508,945 | A | | 5/1950 | Heuer | 211/75 |
| 3,188,030 | A | * | 6/1965 | Fischer | 248/68.1 |
| 3,432,496 | A | | 3/1969 | Chiddix | 260/242 |
| 3,464,661 | A | * | 9/1969 | Alesi, Jr. | 248/68.1 |
| D228,694 | S | | 10/1973 | Ritsi | D83/8 R |
| D232,917 | S | * | 9/1974 | Vincent | D8/354 |
| 3,856,246 | A | * | 12/1974 | Sinko | 248/68.1 |
| 3,986,695 | A | | 10/1976 | Hronas | 248/223 |
| 4,202,520 | A | * | 5/1980 | Loos et al. | 248/68.1 |
| 4,865,207 | A | | 9/1989 | Joyner et al. | 215/11.5 |
| D310,417 | S | | 9/1990 | Herritz | D24/48 |
| 5,048,705 | A | | 9/1991 | Lynd et al. | 215/1 A |

(Continued)

*Primary Examiner*—Michelle Clement
(74) *Attorney, Agent, or Firm*—Nelson Mullins Riley & Scarborough, LLP

(57) CLAIM

The ornamental design for a container clip, as shown and described.

DESCRIPTION

FIG. 1 is a perspective view of a container clip embodying the design of the present invention;
FIG. 2 is a front elevational view of the container clip illustrated in FIG. 1;
FIG. 3 is a rear elevational view of the container clip illustrated in FIG. 1;
FIG. 4 is a left side elevational view of the container clip illustrated in FIG. 1;
FIG. 5 is a right side elevational view of the container clip illustrated in FIG. 1;
FIG. 6 is a top view of the container clip illustrated in FIG. 1; and, FIG. 7 is a bottom view of the container clip illustrated in FIG. 1.

1 Claim, 3 Drawing Sheets

Figure 1:
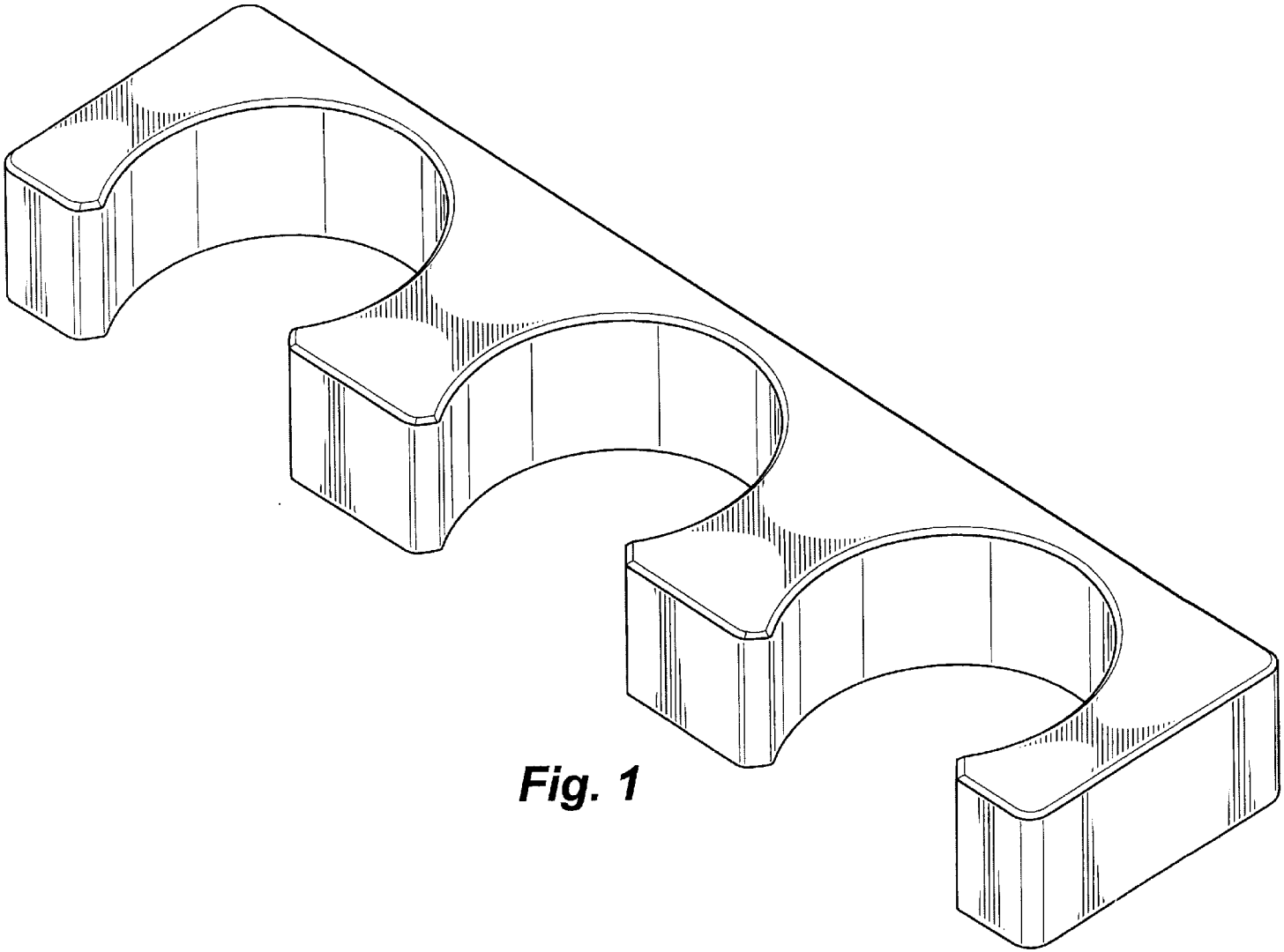
Figure 2:
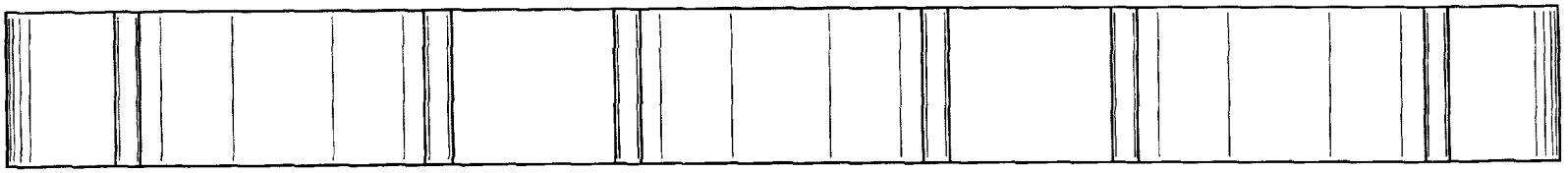
Figure 3:
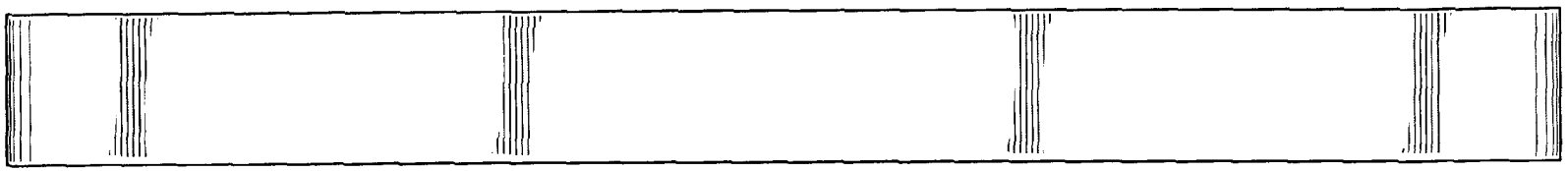
Figure 5:
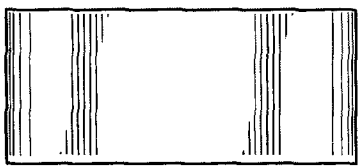
Figure 4:
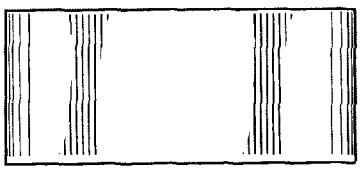
Figure 6:
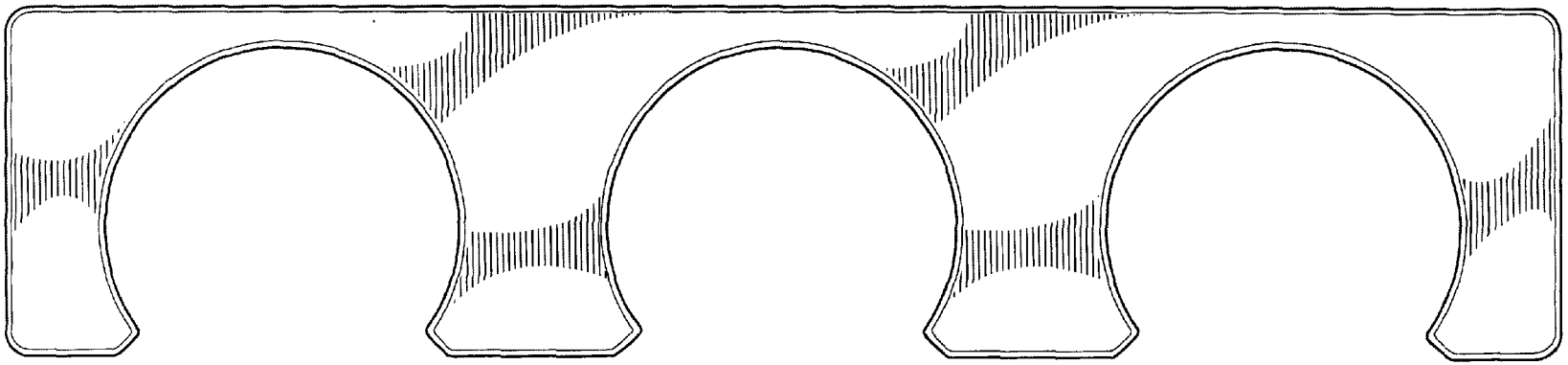
Figure 7:
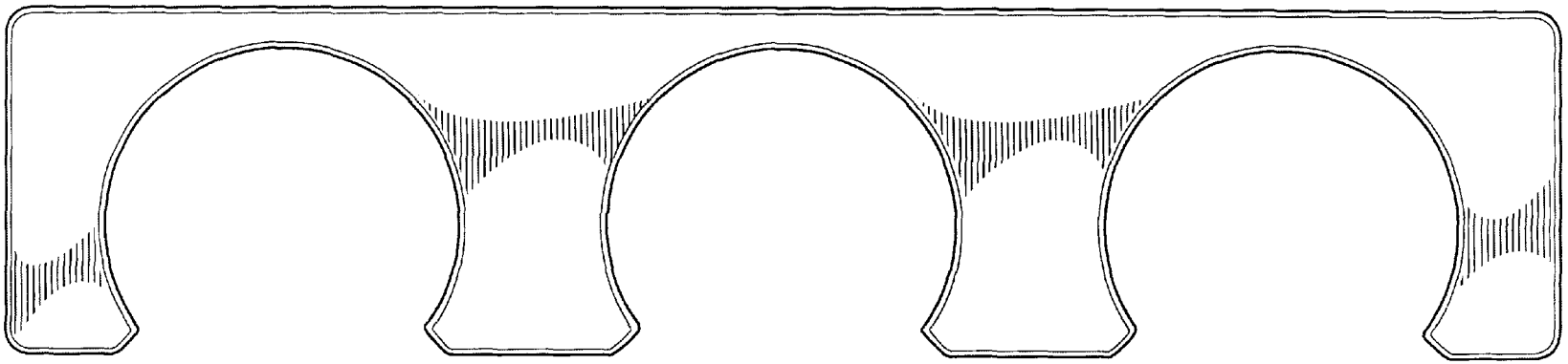

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | | | |
|---|---|---|---|---|---|
| D325,973 | S | | 5/1992 | Chen et al. | D24/197 |
| D326,523 | S | | 5/1992 | Chen et al. | D24/197 |
| 5,191,975 | A | | 3/1993 | Pezzoli et al. | 206/151 |
| 5,358,128 | A | | 10/1994 | Belokin et al. | 211/75 |
| 5,361,918 | A | | 11/1994 | Mason | 215/6 |
| 5,375,726 | A | | 12/1994 | Lechleiter | 211/74 |
| 5,385,128 | A | | 1/1995 | Kratt et al. | 123/335 |
| 5,653,411 | A | | 8/1997 | Picco et al. | 248/74.1 |
| 5,655,673 | A | | 8/1997 | Weterrings et al. | 211/75 |
| D387,171 | S | | 12/1997 | Johnson | D24/197 |
| 5,827,441 | A | * | 10/1998 | Solbjorg | 249/91 |
| D406,349 | S | | 3/1999 | Hammond | D24/197 |
| 5,992,802 | A | * | 11/1999 | Campbell | 248/68.1 |
| D417,611 | S | * | 12/1999 | van de Lande | D8/395 |
| D444,706 | S | | 7/2001 | Giancaspro | D9/455 |
| D450,387 | S | | 11/2001 | Gaona | D24/197 |
| 6,616,000 | B1 | | 9/2003 | Renz | 215/11.1 |
| D481,930 | S | | 11/2003 | Hein | D8/373 |
| D485,161 | S | * | 1/2004 | Hutchinson | D8/383 |
| 6,732,773 | B2 | | 5/2004 | Renz | 141/384 |
| D497,671 | S | | 10/2004 | Renz | D24/197 |
| 2004/0122356 | A1 | | 6/2004 | Burke et al. | |

* cited by examiner